United States Patent [19]

Durow et al.

[11] Patent Number: 4,849,156

[45] Date of Patent: Jul. 18, 1989

[54] NUCLEAR FUEL PIN FABRICATION

[75] Inventors: Kenneth M. Durow; Stephen T. Kennedy, both of Lancashire, United Kingdom

[73] Assignee: United Kingdom Atomic Energy Authority, London, England

[21] Appl. No.: 83,282

[22] Filed: Aug. 10, 1987

[30] Foreign Application Priority Data

Jul. 10, 1987 [GB] United Kingdom ............... 8716240

[51] Int. Cl.$^4$ .............................................. G21C 21/00
[52] U.S. Cl. ..................................... 376/261; 53/525; 29/723
[58] Field of Search ................ 376/261, 260; 414/146; 29/400 N, 723; 53/500, 532, 542, 56, 58, 69, 252, 254, 525

[56] References Cited

U.S. PATENT DOCUMENTS

| 3,924,730 | 12/1975 | Brown | 198/220 R |
|---|---|---|---|
| 3,925,965 | 12/1975 | Rushworth | 53/255 |
| 3,940,908 | 3/1976 | Dazen et al. | 53/258 |
| 3,965,648 | 6/1976 | Tedesco | 53/244 |
| 4,128,161 | 12/1978 | Yonkers | 198/761 |
| 4,541,223 | 9/1985 | Childers | 53/69 |
| 4,680,920 | 7/1987 | Veré et al. | 53/525 |
| 4,748,798 | 6/1988 | Udaka et al. | 376/261 |

FOREIGN PATENT DOCUMENTS

| 2214941 | 8/1974 | France . |
|---|---|---|
| 0670601 | 4/1952 | United Kingdom . |
| 0703364 | 2/1954 | United Kingdom . |
| 0925015 | 5/1963 | United Kingdom . |
| 0937612 | 9/1963 | United Kingdom . |
| 1154042 | 6/1969 | United Kingdom . |
| 1175368 | 12/1969 | United Kingdom . |
| 1461731 | 1/1977 | United Kingdom . |
| 2001732 | 2/1979 | United Kingdom . |
| 2022309 | 12/1979 | United Kingdom . |
| 1577408 | 10/1980 | United Kingdom . |
| 2069223 | 8/1981 | United Kingdom . |

Primary Examiner—Deborah L. Kyle
Assistant Examiner—Daniel Wasil
Attorney, Agent, or Firm—William R. Hinds

[57] ABSTRACT

A system for loading nuclear fuel pellets into tubular fuel pins. The system includes means for locating a fuel pin in registry with a pellet channel to enable a pellet stack to be displaced lengthwise into the fuel pin. The pellet channel and the pin locating means are mounted on a common structure. Linear vibrator means comprise first driving means arranged to urge the common structure in a lengthwise direction, and second driving means arranged to urge the common structure in a substantially perpendicular direction, so that the common structure is driven in a closed loop. Sensing means provide a signal upon cessation of pellet motion upstream of the fuel pin locating means. Means operable in response to said signal automatically adjust the phase relationship between said first and second driving means to effect reverse motion of the pellets.

4 Claims, 5 Drawing Sheets

NUCLEAR FUEL PIN FABRICATION

This invention relates generally to the fabrication of fuel pins for nuclear reactors and is particularly concerned with the loading of fuel pellets into fuel pins. Typically the fuel pellets are collected on a support so that they are located end-to-end and form a stack and the pellets are advanced into a fuel pin which is required to be accurately aligned with the pellet stack to ensure a smooth transfer of the pellets from the support into the pin without damage to the pellets which, particularly when of a ceramic fuel material, tend to be friable. The need to ensure a smooth and damage-free transfer of the pellets is particularly important if automatically operating fuel pin loading apparatus is to be used, so as to avoid or limit manual handling of the pellets, especially where the nuclear fuel is of a toxic nature such as plutonium-containing fuel or reprocessed uranium oxide fuel.

One of the areas of difficulty in securing smooth and damage free pellet transfer lies in the close fitting tolerances imposed on the pellets and the tubular pin cladding. For example, in the case of fuel for one form of liquid metal cooled fast breeder reactor, the internal diameter tolerance limits for the pin cladding lie between 0.199 and 0.201 inches whilst those for the external pellet diameter lie between 0.193 and 0.197 inches which means, in extreme cases, the difference between pellet external diameter and cladding internal diameter may be as small as 0.002 inches. Clearly, very precise pellet to cladding alignment is needed to ensure smooth and damage-free pellet transfer.

British Patent Nos. 1577408, 2022309 and 2069223 disclose a typical approach adopted for obtaining accurate alignment, in which a pellet guide device is arranged to immediately precede the pin cladding, the guide device defining a close fitting, cylindrical bore having a funnel-shaped entrance which serves to receive the pellets with substantial clearance and leads into a bore section whose diameter corresponds closely to the internal diameter of the cladding. The outlet of the bore is adapted to engage with the pin cladding to effect alignment between the bore and the cladding.

Although this approach enables the specific problem of alignment between pellet and cladding to be solved, it does not deal adequately with the problem of dust accumulation from the pellets which, as stated previously, tend to be relatively friable. Bearing in mind the close fitting tolerances between the pellets and the cladding (and hence the guide bore), it will be appreciated that the accumulation of dust particles in the guide bore leads to a serious risk of pellet jamming especially in the case of pellets having diameters at or close to the upper limit of the tolerance range.

Disclosed herein is an improved form of pellet guide device which at least reduces or overcomes the problem of dust production while allowing accurate alignment between the pellets and cladding to be achieved.

According to one aspect of the disclosure there is provided a nuclear fuel pellet guide device which comprises a body provided with a guide passage which will allow feed therethrough of pellets up to a predetermined diameter, characterised in that the guide passage has a cross-section which is oversize relative to a pellet of said predetermined diameter and is provided with means for locating a pellet of said predetermined size in a well-defined position with clearance between the pellet and at least a major part of the passage wall.

Preferably the guide passage is provided with at least one internally projecting rib extending lengthwise of the passage. Conveniently a plurality of said ribs are provided and they are conveniently arranged so that, in use, a pellet of said predetermined diameter is located with clearance from the passage wall around the entire cylindrical periphery of the pellet, ie the pellet is contacted only by said ribs.

According to a second aspect of the disclosure there is provided a nuclear fuel pellet guide device which comprises a body provided with a guide passage which will allow feed therethrough of pellets up to a predetermined diameter, characterised in that the guide passage has a cross-section which is oversize relative to a pellet of said predetermined diameter and is provided with pellet-engaging surfaces which extend generally lengthwise of the guide passage and are inscribed by a circle of said predetermined diameter.

The pellet-engaging surfaces may be provided by internally projecting ribs whose inner extremities are inscribed by said circle. In an alternative arrangement, the pellet-engaging surfaces may be provided by the flats of a passage of polygonal cross-section (eg of square cross-section).

The or each rib is conveniently continuous, ie it extends generally along the guide passage without interruption, thereby facilitating manufacture.

In a preferred embodiment, the or each rib extends substantially parallel to the axis of the guide passage.

Although the ribs alone may serve to locate the pellets within the passage, such location may be by cooperation of the pellet with both the rib(s) and the passage wall.

The guide passage is advantageously defined by a tubular insert (eg of a hard ceramic material such as tungsten or silicon carbide or a material having similar properties to tungsten or silicon carbide) mounted in the body and the rib(s) may be integral with the insert.

In one embodiment the passage-defining insert is composed of tungsten carbide (or a similar hard ceramic material) and the rib(s) is/are formed by spark erosion machining of the insert. Where the insert is composed of silicon carbide, it may be produced by a casting technique such as slip casting. The insert may be peripherally continuous.

The or each rib may be shaped so as to provide substantially line contact with pellets thereby avoiding extended surfaces of rubbing contact which tend to promote dust production. To this end, the or each rib conveniently presents a generally convex surface to the interior of the passage.

The body of the device may be of a unitary nature or it may comprise two or more body parts in which event the body parts are conveniently releasably connected to each other or may be mounted for movement towards and away from each other.

The pellet guide device is preferably used in combination with a pin-locating device as defined below.

Thus, according to this further aspect a fuel pin locating device comprises a body provided with a pin-receiving passage which will allow insertion therein of a generally cylindrical pin up to a predetermined diameter, characterised in that the receiving passage has a cross-section which is oversize relative to a pin of said predetermined diameter and is provided with means for locating a pin of said predetermined size in a well-defined position with clearance between the pin and at least a major part of the receiving passage wall.

The locating means may comprise one or more pin-contacting surfaces. In one embodiment, the receiving passage is provided with a plurality of pin-contacting surfaces (eg internally projecting ribs) whose inner extremities are inscribed by a circle of predetermined diameter.

In general, the features specified previously in relation to the pellet-containing surface(s), guide passage and body of the pellet guide device may also apply to the pin-contacting surface(s), receiving passage and the body of the pin locating device.

In practice, the pellet guide device and the pin locating device are arranged with the guide and receiving passages thereof generally aligned in such a way that, in use, a pellet of said predetermined size is coaxially aligned with a fuel pin of the appropriate predetermined size for the receiving passage.

The bodies of the two devices may be secured together or they may be integral with each other.

The cross-sectional profile of the pellet guide passage or pin receiving passage may be circular but it will be appreciated that this is not essential; in a preferred embodiment the passage is of generally square profile with a rib located midway along each side of the square. Because the passage is oversize even with respect to pellets or pins of the respective predetermined size, substantial spaces are available for the accumulation of any dust that may arise during loading of pellets into the pins, thereby considerably reducing the risk of pellet jamming. Access may be provided to allow accumulated dust to be removed, eg by suction, periodically from the passage.

According to a further aspect there is provided a system for loading nuclear fuel pellets into tubular fuel pins comprising a pellet guide device as defined above, a pin locating device as defined above, said devices being arranged with their respective guide and receiving passages in alignment, means for supporting a fuel pin with an open end thereof engaged in said receiving passage and means for feeding pellets in endwise relation with one another into and through the pellet guide passage and thence into a fuel pin engaged with the receiving passage.

According to an aspect of the invention there is provided a system for loading nuclear fuel pellets into tubular fuel pins comprising a channel for locating a plurality of pellets in endwise relation with each other so that the pellets form a stack, means for locating a fuel pin with an open end thereof in registry with the pellet channel to enable the pellet stack to be displaced lengthwise into the fuel pin, the pellet channel and the pin locating means being mounted on common structure, and linear vibrator means for subjecting the common structure to vibrationl modes both lengthwise of the channel and substantially perpendicular thereto, said linear vibrator means comprising first driving means arranged to urge the common structure principally in said lengthwise direction and second driving means arranged to urge the common structure principally in said substantially perpendicular direction, said first and second driving means being so arranged that, in operation, the common structure is driven in a closed loop motion.

The phase relationship between said first and second driving means is conveniently variable so that the rate of pellet feed can be controlled and, if desired, reversed when there is a requirement to withdraw the pellet stack away from the fuel pin, for instance in the event of jamming.

One form of linear vibrator which may be employed in practising the last-mentioned aspect of the invention is disclosed in prior British Patent No. 1154042 to which reference should be made for further details. A system as defined above may further comprise sensing means for providing a signal upon cessation of pellet motion upstream of said fuel pin locating means and means, operable in response to a signal produced by the sensing means, for automatically adjusting said phase relationship between said first and second driving means to effect reverse motion of the pellets away from the pin-locating means.

The arrangement may be such that the reverse motion is effected for a predetermined length of time or until the pellet stack has reversed back for a predetermined distance and thereafter the vibrator means is operable to revert to the original feed direction to return the pellets towards the pin locating means. If cessation of pellet motion again occurs, the automatic adjusting means again becomes operable to reverse the pellets away from the pin locating means. At this point, an alarm signal may be produced, as a consequence of the second sensing of pellet motion cessation, to alert an operator of the need for manual intervention. Alternatively, the procedure of restoring pellet motion in the original feed direction followed by reversal by the automatic adjusting means may take place two or more times before an alarm signal is initiated. The alarm signal may also be used to arrest further operation of the linear vibrator means at least until manual intervention takes place.

The sensing means is conveniently arranged to count the number of pellets approaching, and (where applicable) moving away from, the fuel pin locating means and, in the event of pellet motion reversal, compare the counts in each direction whereby the absence of one or more pellets from the stack moving away from the pin-locating means can be detected. If the result of comparison indicates the absence of one or more pellets, the previously-mentioned alarm signal may be produced after the first reversal of pellet feed and, in this event, the vibrator may be disabled without attempting to feed the pellets back towards the pin locating means. If, however, the comparison does not indicate the absence of any pellets, the previously-described procedure may be followed since it can be assumed that there is no pellet jammed.

The sensing means is preferably non-contacting and conveniently comprises an optically-sensitive device, such as a linescan camera, which may be arranged to detect pellets and pellet motion by virtue of the change in contrast between the pellet surfaces and the interpellet gaps. The pellet stack may be illuminated stroboscopically at a suitable frequency so that the sensing means is unaffected by vibration of the pellets.

Further aspects and features of the invention will become apparent from the following description, given by way of example only, with reference to the accompanying drawings, in which.

Figure 1:
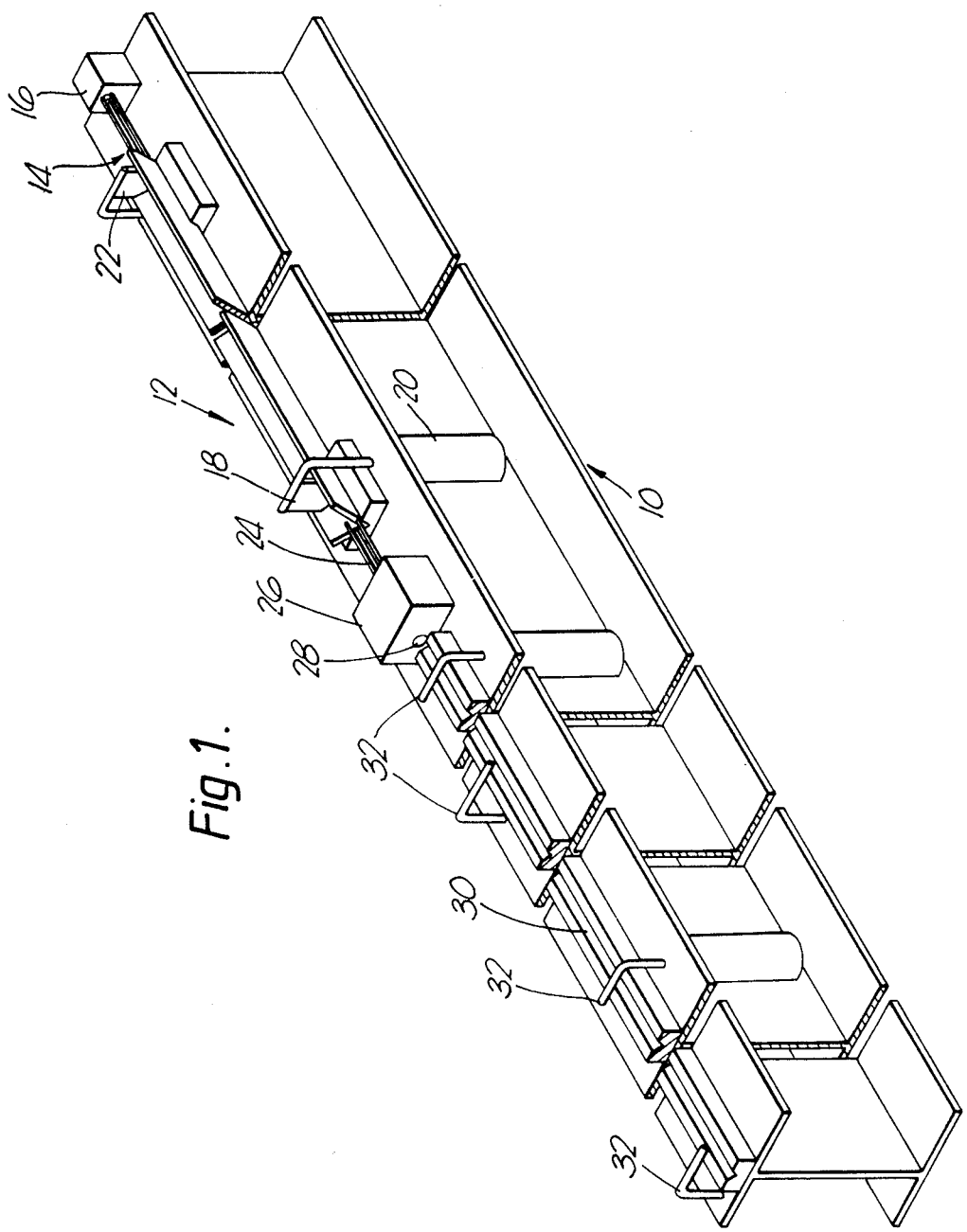
FIG. 1 is an isometric view of a fuel pellet loading system, with parts omitted from the drawing to reduce the overall length of the system to facilitate illustration.
Figure 2:
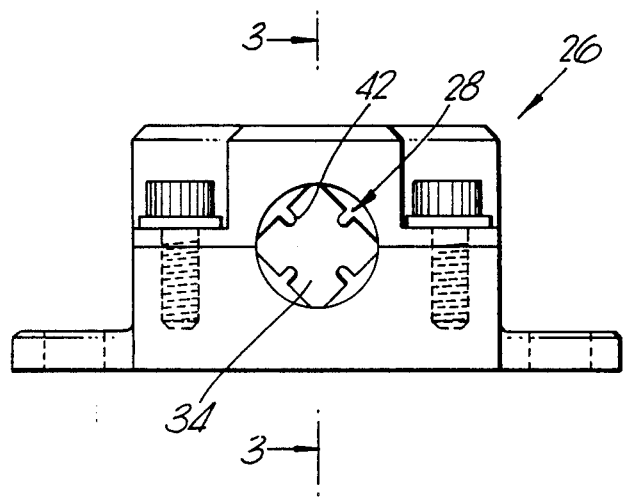
FIG. 2 is an end view of the pellet guide structure of the system of FIG. 1.

Referring now to FIG. 1, there is shown a system for loading nuclear fuel pellets into fuel pins. The system comprises a main support 10 in the form of a I-section beam arranged with its axis generally horizontal. A linear elliptic throw vibrator of the type disclsed in British Patent No. 1154042 will be coupled to the I-beam so as to subject it to suitably phased vibrational modes both lengthwise of the beam and also in a substantially vertical plane to effect pellet feed.

The beam 10 mounts a channel 12 of V-section which is preceded by an openwork guide structure 14 connected, via a guide block 16 and a vibration-isolating flexible tube (not shown), to a vibratory bowl feeder (not shown) for supplying nuclear fuel pellets in serial fashion. The bowl feeder is conveniently constructed and arranged to operate in the manner described in our prior patent application serial number 2171522 so that any defective pellets are rejected. The channel 12 is provided with a gate 18 adjacent its downstream end, the gate 18 being movable between a pellet blocking position and a non-blocking position by a fluid-powered cylinder 20. A similar gate 22 is located adjacent the upstream end of the channel 12, the spacing between the gates 18, 22 corresponding to the pellet stack length required for a single pin. Thus, gate 18 serves to hold up the pellets to allow the stack to build up to and beyond the required length while gate 22 (also operated by an unshown fluid-powered cylinder) serves to isolate the stack that has built up from subsequent pellets by holding up feed motion of the subsequent pellets. An openwork guide structure 24 is provided as a continuation of the downstream end of the channel 12. The openwork structures each comprise a number of angularly spaced rods defining, in effect, a cage along which the pellets can travel, the open nature of the structures allowing any dust particles to fall away from the pellets in these regions.

The guide structure 24 leads the pellet stack into a pellet guide/pin locating assembly 26 (shown diagrammatically) which will be described in detail below. On its downstream side, the assembly 26 has an entrance 28 which is aligned with a pin support channel 30 which serves to locate the pin in coaxial relation with the pellet stack fed through the assembly 26. A number of clamps 32, operable by fluid powered cylinders 34, are arranged to effect releasable clamping of the pin when the latter is supported by channel 30 with an open end thereof received within the assembly 26 via entrance 28.

As shown in FIGS. 2-5, the assembly 26 comprises two axially successive sections, a pellet guide section 28 and a pin locating section 30, each defined by a tubular insert (of a hard ceramic material such as silicon carbide or tungsten carbide) received in an axial cylindrical throughbore 32, formed in the two-part body of the assembly 26. Each insert 28, 30 defines a passage 34, 36 which has a cross-section considerably greater than the largest diameter pellet 38 or pin 40, depicted in broken outline, that can be received within the passage 34, 36.

Figure 3:
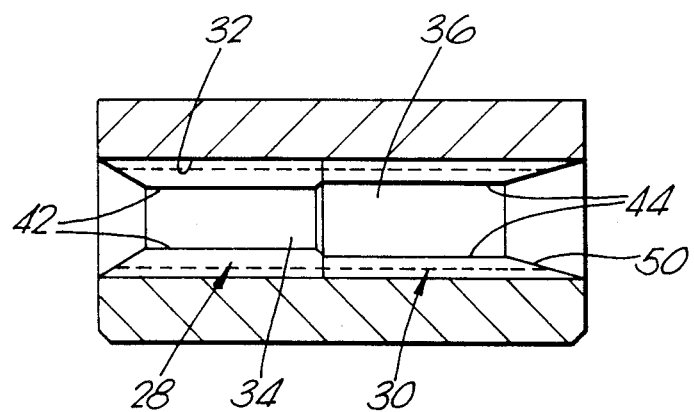
FIG. 3 is sectional view in the direction 3—3 in FIG. 2.
Figure 4:
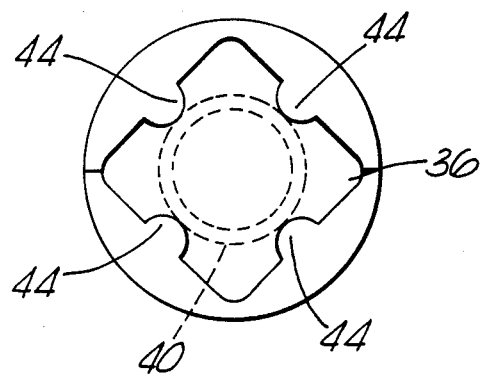
FIGS. 4, 5 and 6 are cross-sectional views of the pellet guide and pin locating inserts.
Figure 5:
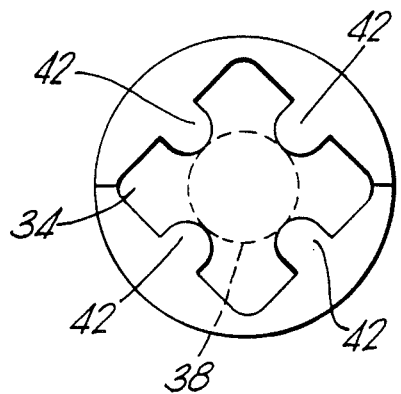

In the embodiment illustrated in FIGS. 2-5, the passage 34, 36 are of generally square profile in section and are provided with internally projecting axial ribs 42, 44 each located midway along each side of the square. The radially inner extremities of the ribs 42 of the pellet guide section may be arranged so that they are inscribed by a circle of 0.198 inch diameter, ie so as to accommodate with clearance pellet diameters within a tolerance range of 0.193 to 0.197 inch, this tolerance range being the acceptable variation in pellet diameters for the particular type of pellet for which the system has initially been designed, i.e. fast breeder reactor pellets. Of course, the dimensions will differ according to reactor design, the above dimensions being specified merely by way of example. Similarly, in this example, the radially inner extremities of the ribs 44 are arranged so that they are inscribed by a circle of 0.232 inch so as to accommodate pin outside diameters up to this diameter. At the entrance end of the pellet guide insert 28, the ribs 42 are bevelled or chamfered as shown in FIG. 3 at the left end of insert 28 to provide a lead-in for, and also centre, the pellets. The ribs 44 at the entrance end of the pin-receiving insert 30 are likewise chamfered or bevelled at 50 to facilitate insertion and centring of the fuel pins. The ribs 42, 44 thus serve to locate the pellets and fuel pins in coaxial relation with each other. The junction between the ribs 42 and 44 provides an axial stop to limit the extent to which a fuel pin can be inserted into the assembly 26.

The ribs 42, 44 present convex surfaces inwardly of the inserts and therefore make substantially line contact with the pellet and pin respectively, this being particularly advantageous in the case of the pellets since the areas of rubbing contact between the pellets and the guide are minimised thereby tending to reduce the quantity of dust generated and to prevent a build-up of dust on the contact surfaces. Any dust that accumulates may collect in the relatively capacious spaces of the insert which remain unoccupied by the pellets.

Figure 6:
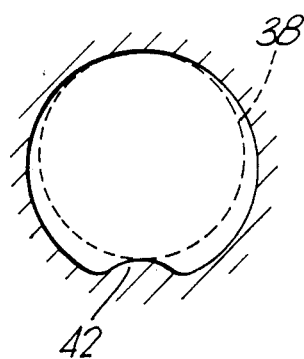

In the illustrated embodiment, there are four ribs on each insert. There may be a lesser number, eg three ribs spaced apart to give three point centring of the pellets or ribs. It is feasible also to employ a single rib or two ribs only in which case a part of the passage will be profiled to assist in location of the pellets or pins, as illustrated diagramatically in FIG. 6. Thus, as shown, the pellet 38 is located by rib 42 and the section of the passage wall generally diametrically opposite the rib 42. Pellets of smaller diameter than that illustrated will tend to tilt about the rib 42 but such tilting can be limited by suitable profiling of the passage wall.

In another modification, the pellet or pin receiving passage may be of polygonal cross-section (eg square) such that the flats of the polygon contact the pellet or pin with substantially line contact and substantial clearance is provided in the regions of the corners.

The embodiment of FIGS. 1-5 is intended for horizontal feeding of pellets; however it will be understood that the same principles, particularly in terms of pellet guide and pin location, may be employed in an arrangement in which the pellets are fed along a generally vertical path into vertically disposed pins. Also the invention may be used for loading a number of lines of pellets simultaneously into respective pins.

Although the device 28 in FIGS. 2-5 is illustrated as essentially a unitary component, it may be separated axially into two halves respectively incorporating the pellet and fuel pin guides. The two halves may then be mounted on robust hinges, possibly with dowel location, or they may move into and out of registry on a die set principle. Such an arrangement facilitates cleaning of the guides or freeing of blockages and may also facilitate unloading of fuel when the conveyor is reversed.

Figure 7:
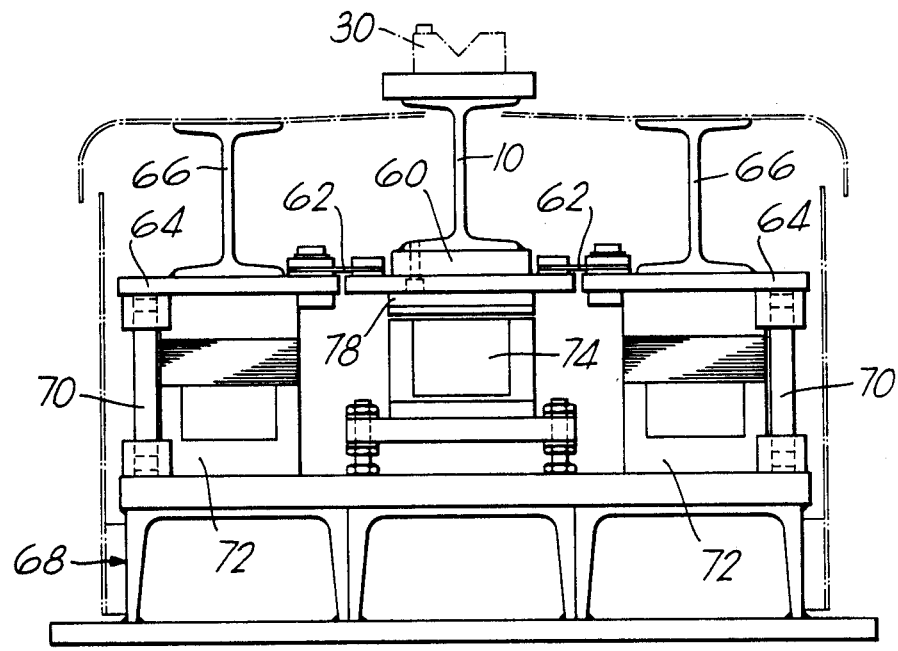
FIGS. 7-9 are end, plan and fragmentary side views respectively showing the vibratory mounting arrangement for the pellet feeder.
Figure 8:
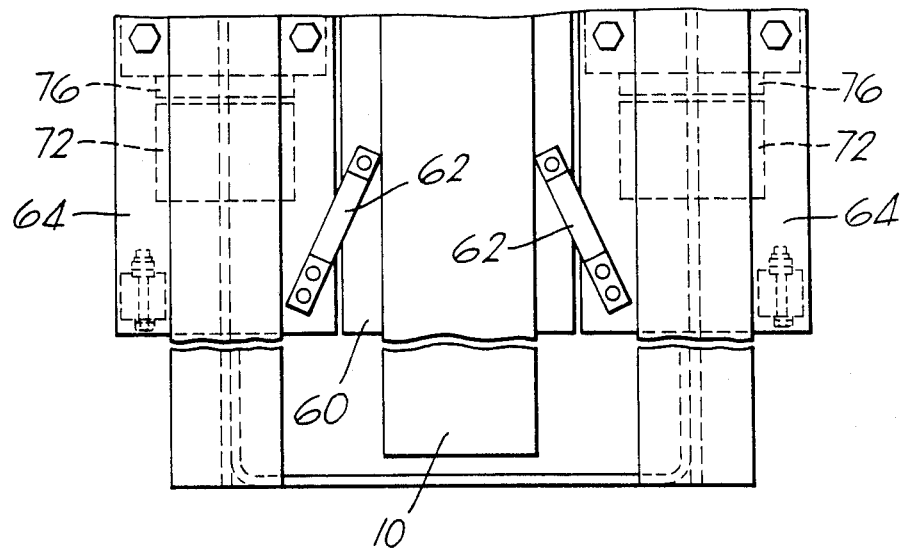
Figure 9:
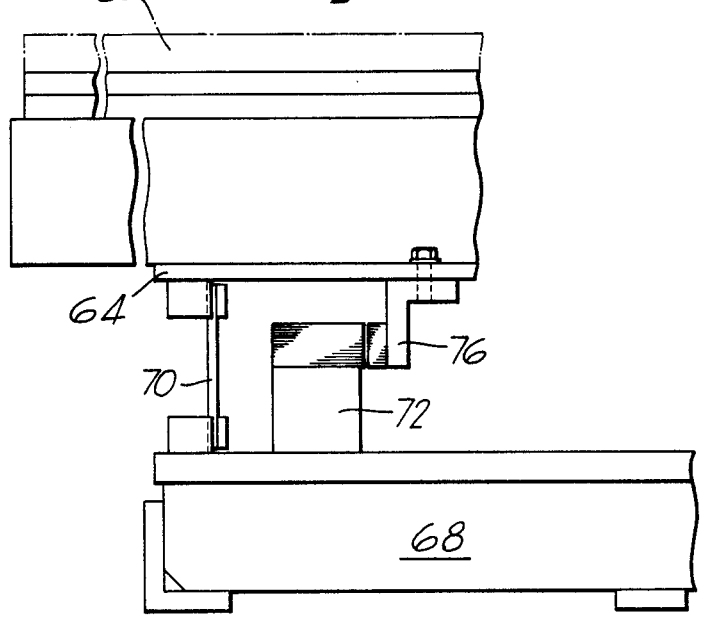

The mounting of the support beam 10 is shown in greater detail in FIGS. 7–9. The beam 10 is affixed to a base plate 60 which is generally co-extensive with the beam 10 and is coupled at each side thereof, by a series of generally horizontally disposed spring elements 62, to a pair of side plates 64 which are also generally co-extensive with the beam 10 and are connected to I-section beams 66 to impart rigidity thereto. The spring elements 62 are disposed obliquely with respect to the longitudinal axis of the beam 10 and are rigidly secured at each end to the plates 60, 64 to constrain the beam 10 to substantially vertical motion. The side plates 64 are coupled to a rigid base structure 68 via generally vertically disposed spring elements 70 which are rigidly secured at each end and constrain the plates 64 to substantially horizontal motion in the direction of the axis of the beam 10. It will be seen that this arrangement permits the beam to undergo displacements horizontally in the direction of its axis and also vertically.

Vibration of the beam is effected by electromagnetic actuators 72, 74. Actuators 72 co-operate with vertical armature plates 76 to impart horizontally-directed vibratory motion to the beam 10, via the side plates 64, while actuator 74 co-operates with armature plate 78 to impart vertical vibratory motion to the beam. The actuators 72 may be located adjacent each end of the beam 10 and the actuator 74 may be located generally centrally of the beam. The actuators 72, 74 are energised by control circuitry (not shown) for controlling the relative phases of the horizontal and vertical vibratory components to produce optimum feed of the fuel pellets. Such phase control also permits the direction of feed to be reversed. The control circuitry may be generally of the form disclosed in prior British Patent Nos. 1154042, 2145584 and 2109169.

Figure 10:
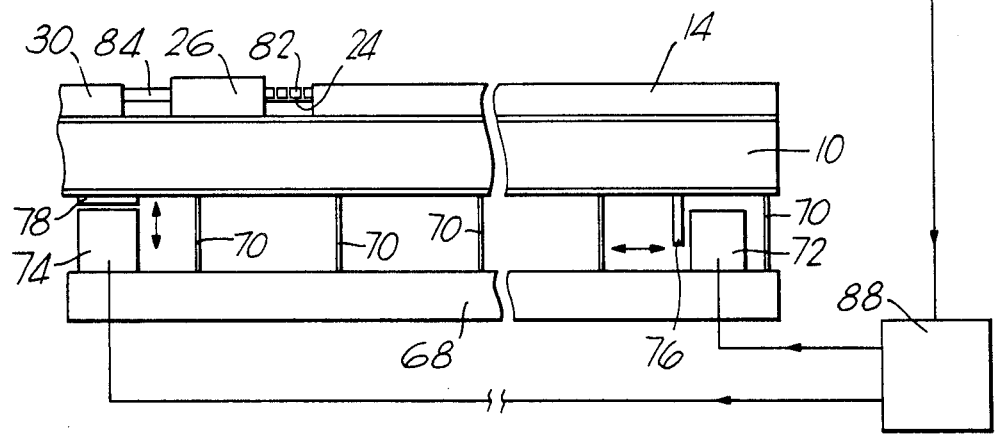
FIG. 10 is a diagrammatic view of the system illustrating a scanning arrangement for detecting cessation of pellet motion.

Referring to FIG. 10, movement of the pellets 82 towards the fuel pin 84 is detected by means of an optoelectronic sensor 86, which may comprise a linescan camera, arranged to detect the changes in contrast between the pellet surfaces and the interpellet gaps. The pellets may be illuminated stroboscopically by a suitable source of, for example, infra-red radiation (not shown) to which the sensor 86 is responsive. The actuators 72, 74 are controlled by an electronic controller 88 incorporating phase adjustment circuitry for selectively varying the phase angle between the horizontal and vertical vibratory components imparted to the beam 10 by the electromagnetic actuators 72, 74. The controller 88 receives the output from the sensor 86 and the arrangement is such that, if cessation of pellet motion is sensed eg as a result of a jammed pellet, the controller 88 automatically effects phase angle adjustment to reverse the pellet feed direction. As well as withdrawing the pellets away from the fuel pin/pellet guide assembly 26, reversal of the vibratory drive will also serve to reverse feed any dust or particles which may have accumulated in the assembly and may be the cause of a pellet jam. The particles/dust so removed will fall through the skeletal guide structure 24.

The arrangement may be such that once the pellets have been reverse fed for a certain distance or time period, the drive is restored to forward motion to advance the pellet stack back towards the assembly 88 since the removal of accumulated dust or particles may have cleared the cause of jamming. If jamming recurs, reversal of drive is again effected and a warning signal is produced by the controller to alert an operator the need for manual intervention.

The sensor 86 may incorporate or be associated with a counter for recording the number of pellets passing a predetermined point. In this way the number of pellets passing that point prior to a jam may be compared with the number passing during reverse pellet motion after detection of a jam thereby enabling the detection of a pellet or pellets remaining jammed in the assembly 26. The counter may for example be an up-down counter and, if the count is non-zero after reversal of the pellet stack this is indicative of a pellet remaining jammed. The output signal produced by the sensor 86 may thus indicate whether or not there is a "missing" pellet and the controller 88 may operate accordingly—ie if there is a "missing" pellet the warning signal may be produced at that point instead of restoring forward feed of the pellet stack.

We claim:

1. A system for loading nuclear fuel pellets into tubular fuel pins comprising a channel for locating a plurality of pellets in endwise relation with each other so that the pellets form a stack, means for locating a fuel pin with an open end thereof in registry with the pellet channel to enable the pellet stack to be displaced lengthwise into the fuel pin, the pellet channel and the pin locating means being mounted on common structure, linear vibrator means for subjecting the common structure to vibrational modes both lenthwise of the channel and substantially perpendicular thereto, said linear vibrator means comprising first driving means arranged to urge the common structure principally in said lengthwise direction and second driving means arranged to urge the common structure principally in said substantially perpendicular direction, said first and second driving means being so arranged that, in operation, the common structure is driven in a closed loop motion, sensing means for providing a signal upon cessation of pellet motion upstream of said fuel pin locating means, and means, operable in response to a signal produced by the sensing means, for automatically adjusting said phase relationship between said first and second driving means to effect reverse motion of the pellets away from the pin-locating means.

2. A system as claimed in claim 1 in which said adjusting means is arranged to automatically restore forward motion of the pellets towards the pin-locating means and means is provided for generating an alarm signal if cessation of such restored forward motion is again detected by the sensing means.

3. A system as claimed in claim 2 in which the sensing means is arranged to count the number of pellets approaching or moving away from the fuel pin locating means, and in the event of pellet motion reversal, compare the counts in each direction to detect the absence of one or more pellets from the stack moving away from the pin locating means.

4. A system as claimed in claim 1 in which the sensing means is arranged to count the number of pellets aproaching or moving away from the fuel pin locating means, and in the event of pellet motion reversal, compare the counts in each direction to detect the absence of one or more pellets from the stack moving away from the pin locating means.

* * * * *

UNITED STATES PATENT AND TRADEMARK OFFICE
CERTIFICATE OF CORRECTION

PATENT NO. : 4,849,156
DATED : July 18, 1989
INVENTOR(S) : Stephen T. Kennedy

It is certified that error appears in the above—identified patent and that said Letters Patent is hereby corrected as shown below:

On the first page of the printed patent, the information page, "Inventors: Kenneth M. Durow; Stephen T. Kennedy, both of Lancashire, United Kingdom" is changed to read --Inventor: Stephen T. Kennedy,
of Lancashire, United Kingdom.--

Signed and Sealed this

Fourteenth Day of May, 1991

Attest:

HARRY F. MANBECK, JR.

Attesting Officer

Commissioner of Patents and Trademarks